United States Patent

Frase et al.

[15] 3,638,829
[45] Feb. 1, 1972

[54] FINGER-TYPE PLANTER

[72] Inventors: Roland J. Frase, Roselle; Gordon R. O'-Neil, Westmont, both of Ill.

[73] Assignee: International Harvester Company, Chicago, Ill.

[22] Filed: May 14, 1970

[21] Appl. No.: 37,231

[52] U.S. Cl. ...................... 221/219, 221/220, 221/241
[51] Int. Cl. ................................................. A01c 7/12
[58] Field of Search ............... 221/217, 220, 215, 219, 241

[56] References Cited

UNITED STATES PATENTS

| | | | |
|---|---|---|---|
| 2,111,485 | 3/1938 | Boykin | 221/135 |
| 2,613,850 | 10/1952 | Varco | 222/177 X |
| 1,314,683 | 9/1919 | McWhorter | 221/215 |
| 1,660,549 | 2/1928 | Davis | 221/241 X |

*Primary Examiner*—Robert B. Reeves
*Assistant Examiner*—John P. Shannon, Jr.
*Attorney*—Floyd B. Harman

[57] ABSTRACT

Seed metering apparatus for planters which includes a housing having a seed supply and a seed selecting disk rotatable in the housing with its lower peripheral portion disposed in the seed supply, the disk having spring fingers mounted thereon with seed clasping portions yieldable to an open or seed receiving position and axially biased to a closed or seed clasping position, actuating means being provided in the housing and successively engageable with the fingers to open and close the seed clasping portions thereof.

4 Claims, 6 Drawing Figures

INVENTORS
ROLAND J. FRASE
GORDON R. O'NEIL

INVENTORS
ROLAND J. FRASE
GORDON R. O'NEIL

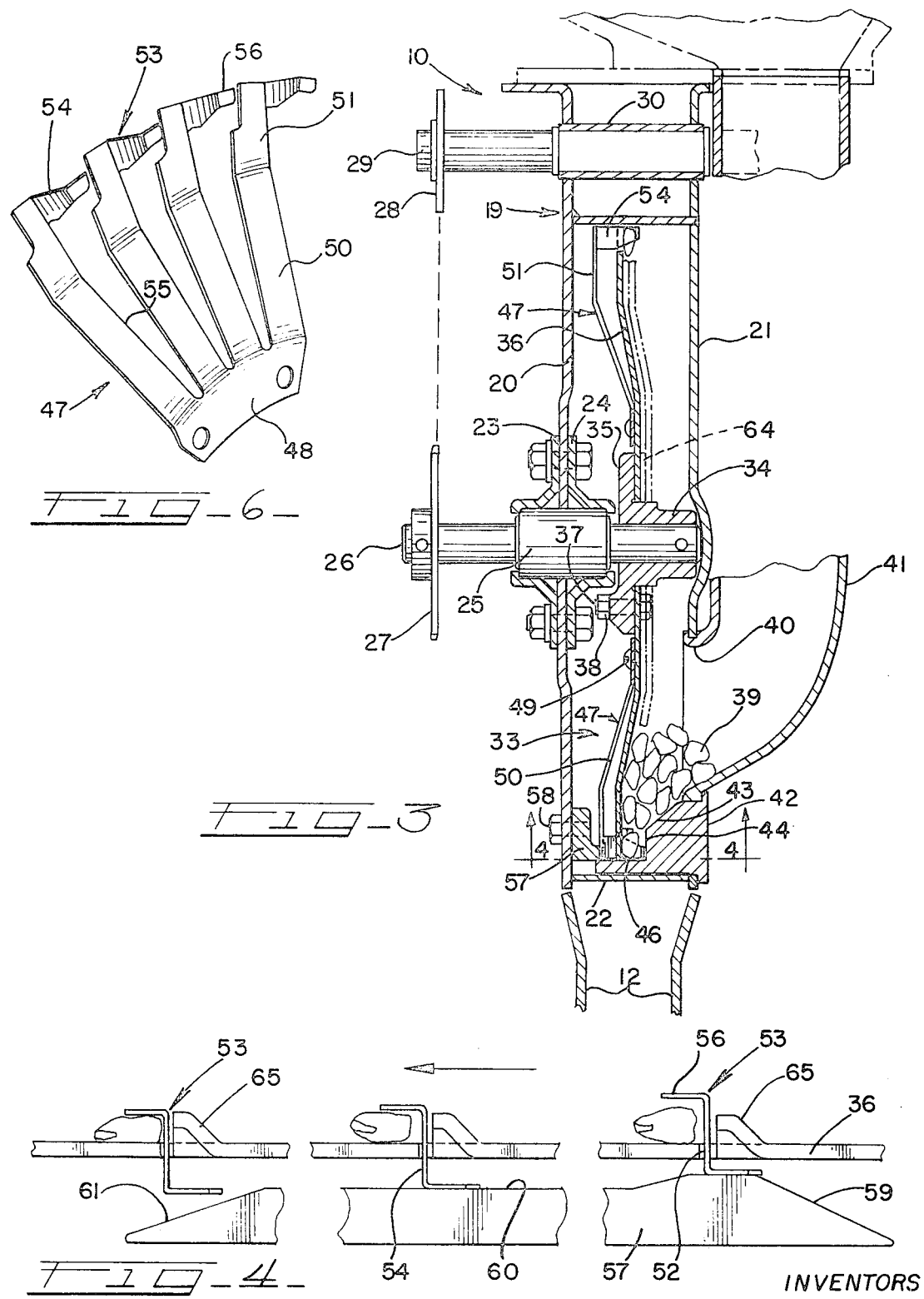

FINGER-TYPE PLANTER

BACKGROUND OF THE INVENTION

This invention relates to planters and particularly to novel seed metering apparatus for planting different kinds and sizes of seed.

The farmer having a conventional planter of the seed plate type and wishing to plant seed of different sizes and shapes is offered the choice of a multiplicity of seed plates having peripheral seed cells shaped to fit seed of a particular size and shape, requiring a substantial investment in seed plates. The practice of grading seed for uniformity, for example corn, requires the farmer to buy a plate having cells to fit the size and shape of seed he has selected for planting. Furthermore, the time and effort required in changing seed plates is substantial and the need for a planter having seed-selecting mechanism which offers sufficient tolerance to permit the use of ungraded seed is obvious.

Planters adapted to dispense seed of different size are known, one such planter being shown and described in copending U.S. Pat. application, Ser. No. 2,011, filed Jan. 12, 1970. Such planters consist of a vertical seed plate rotatable in a supply of ungraded seed and having means for selecting a seed irrespective of minor size variations and conveying it to a point of discharge to the ground. However, most such devices have not been completely reliable in that they have been unable consistently to select a single seed, the seed-selecting means frequently arriving at the discharge point with no seed or with more than one seed, resulting in un-uniform planting. Therefore, an important object of this invention is the provision of improved seed-metering apparatus for planting seed of different size and shape.

Another object of the invention is the provision of novel planting apparatus for planting seed irrespective of size and limiting seed selection to a single seed.

Another object of the invention is the provision of seed-metering apparatus of the type utilizing a rotatable disk or wheel having spring fingers for selecting and holding a single seed, wherein novel means are provided for guiding the seed to the seed-selecting area of the disk.

A further object of the invention is the provision of seed-metering mechanism for seed of varying size and shape wherein the seed-selecting area adjacent the disk is a restricted channel of a width accommodating single seeds and means are provided for adjusting the disk to vary the width of the seed-receiving channel.

DESCRIPTION OF THE DRAWINGS

FIG. 3 is a section taken on the line 3—3 of FIG. 2;

FIG. 4 is an enlarged diagrammatic detail of a portion of the structure shown in FIGS. 2 and 3;

FIG. 6 is a detail in perspective of a portion of the structure shown in FIG. 5.

DESCRIPTION OF THE PREFERRED EMBODIMENT

Figure 1:
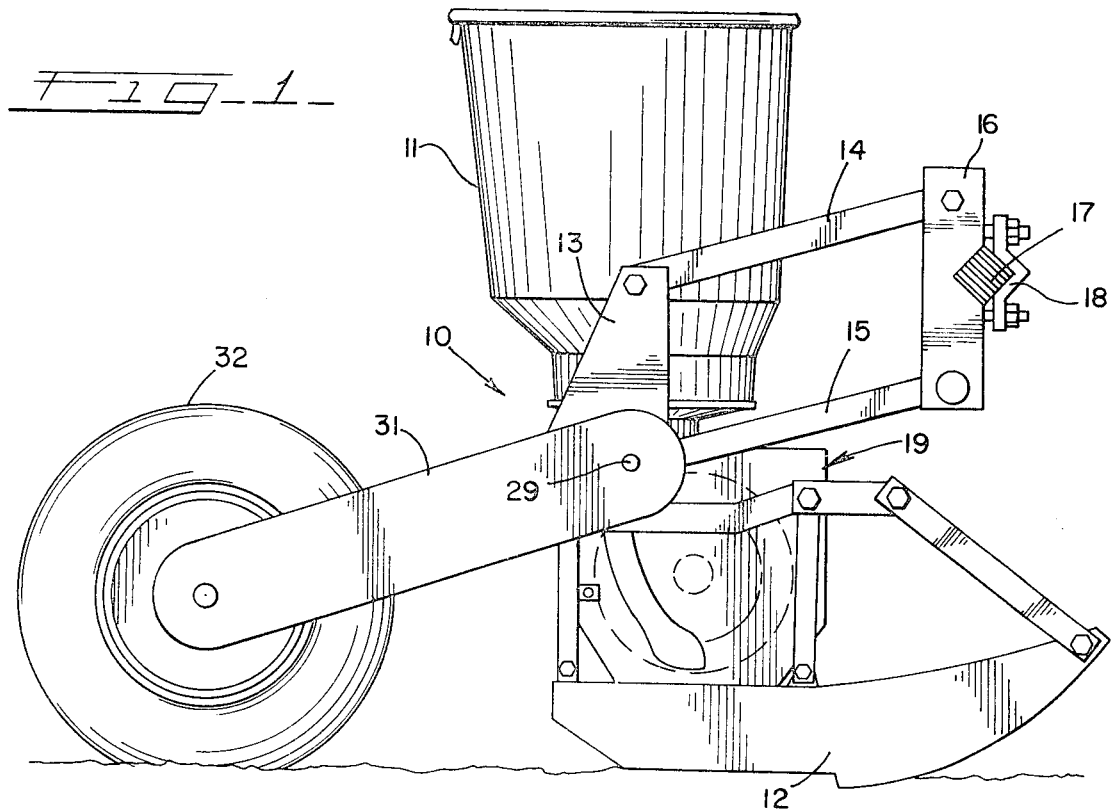
FIG. 1 is a view in side elevation of a planter unit having incorporated therein seed-metering mechanism embodying the features of this invention.
Figure 5:
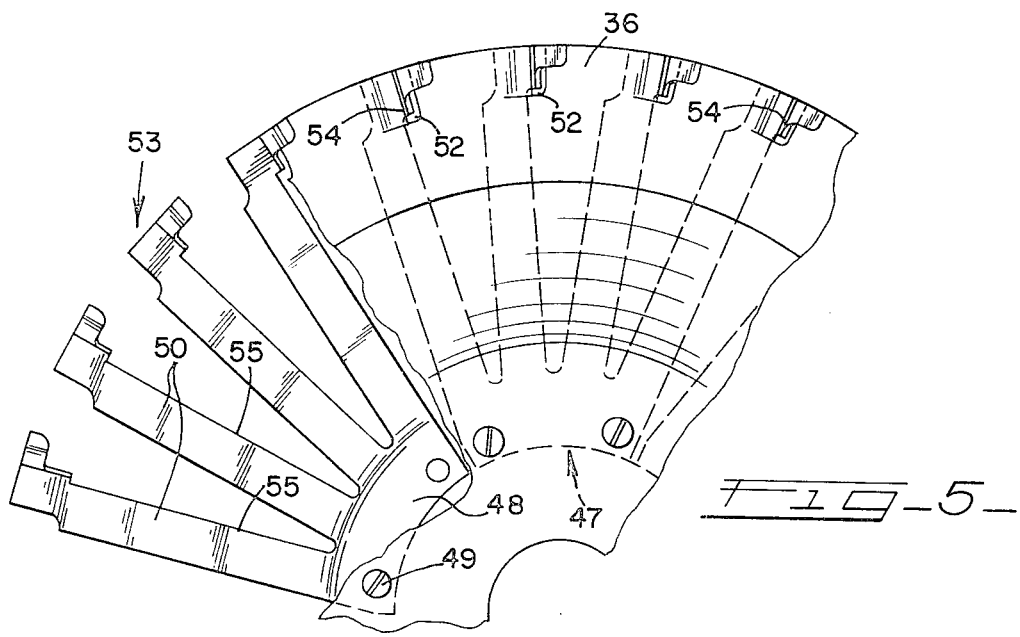
FIG. 5 is an enlarged detail, with a part broken away, of a portion of the seed-metering mechanism of this invention.

In FIG. 1 is illustrated diagrammatically a typical planter unit comprising a frame structure 10 supporting a seed hopper 11 at its upper end and at its lower end a runner furrow opener 12. A standard 13 affixed to the frame is pivotally connected to the rear ends of a pair of vertically spaced parallel suspension links 14 and 15 the forward ends of which are pivotally connected to a bracket 16 secured to a tool bar 17 by a clamp 18.

Frame 10 also includes a housing 19 comprising sideplates 20 and 21 and an internal cylindrical wall 22, and in sidewall or plate 20 are mounted retainers 23 and 24 carrying a bearing 25 in which is rotatably mounted a shaft 26. A sprocket wheel 27 on shaft 26 is driven from another sprocket wheel 28 mounted on a shaft 29 rotatable in a bearing 30 carried by housing 19 and connected by conventional drive transmission means enclosed in a housing 31 to a ground-engaging drive wheel 32 for operating the seed-dispensing means, not shown, for discharging seed from hopper 11.

Seed-metering mechanism 33 is enclosed in housing 19 and comprises a hub member 34, shown in FIG. 3, secured to the portion of shaft 26 extending into the housing and having a flange 35 to which a seed-selecting disk 36 is secured by bolts 37 and nuts 38 and rotatable with shaft 26.

The lower portion of the seed-engaging face of disk 36 is in the path of corn seed 39 fed laterally inwardly toward the disk through an opening 40 in the lower part of sideplate 21 connected by a guide tube 41 to the seed hopper 11. A guide member 42 is mounted in the lower end of wall 21 below the opening 40 and has an inclined or ramp face 43 which directs the seed downwardly and inwardly and terminates in a vertical wall 44 forming with the parallel outer peripheral portion of disk 36 a restricted channel 46, the width of which is sufficient to accommodate only single seeds parallel to the outer face of the disk and directed thereto from ramp 43.

As is clear from FIG. 3, seed-selecting disk 36 is bent axially so that its radially outer portion is offset from and in a plane parallel to the inner portion thereof. On the other face of disk 36 are mounted in a disklike arrangement a plurality of relatively thin spring steel segments 47 each of which comprises a base 48 secured parallel to the radially inner portion of disk 36 by screws 49, and a plurality of radially extending spring fingers 50 bent axially away from disk 36 and having a radially outer portion 51 disposed in a plane substantially parallel to base portion 48, the fingers 50 having a spring bias away from the adjacent face of the disk.

Disk 36 is revolved in the seed supply at the bottom of housing 19 for picking up seed in a manner and by means hereinafter described, releasing and discharging the seed into the furrow formed by the furrow opener 12.

Openings in the form of slots 52 are formed in the outer peripheral portion of disk 36 to slidably receive a seed-engaging and clasping portion 53 including a part 54 bent axially from the leading edge 55 of each finger 50 and extending into channel 46. Part 54 has a seed-clasping pad 56 bent parallel to the seed-engaging face of the disk, finger 50 being yieldable to cause pad 56 to be deflected to the other side of the channel against the wall 44 of guide 42.

Figure 2:
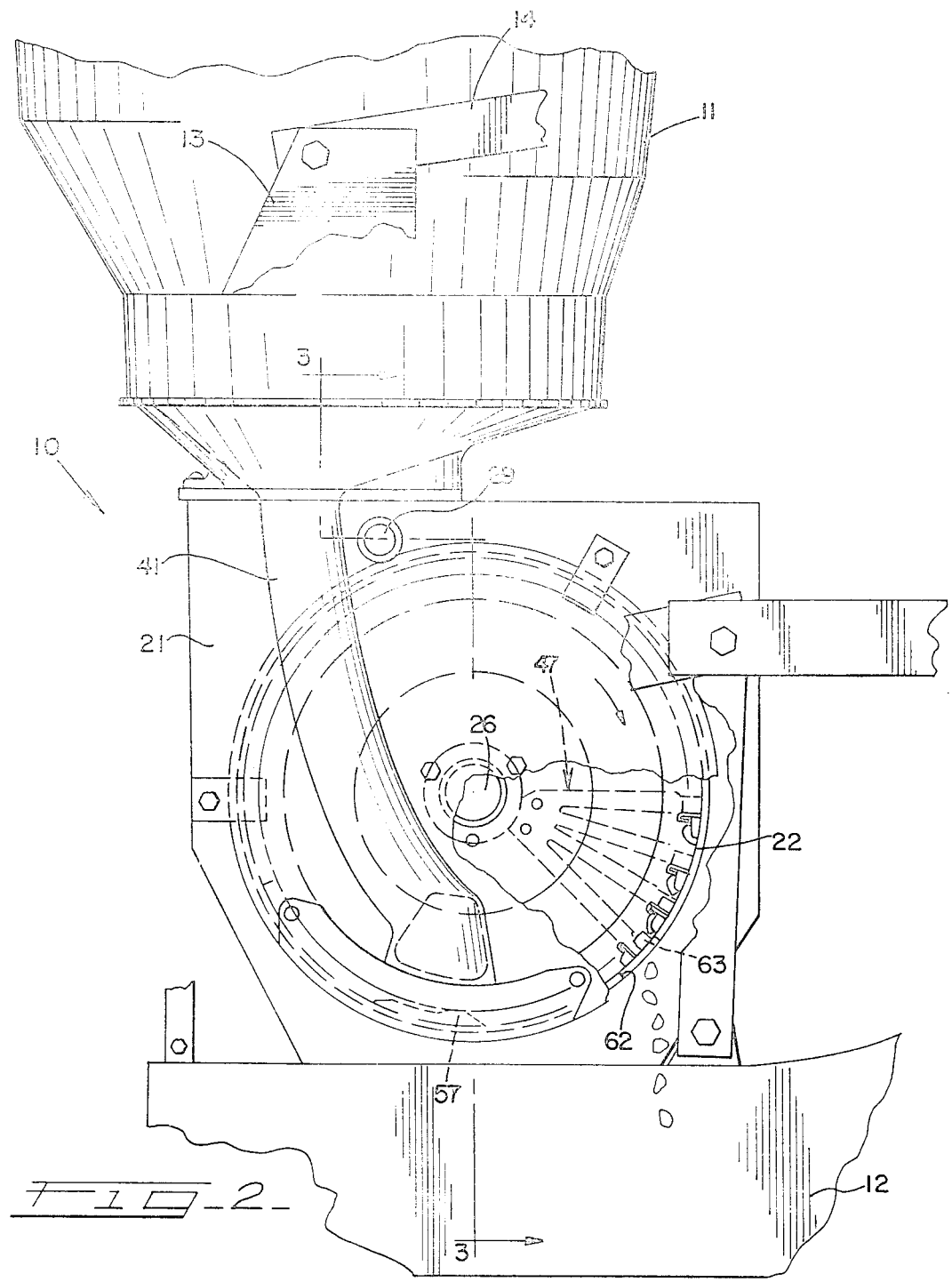
FIG. 2 is an enlarged side elevation, with parts removed and parts broken away, of a portion of the structure shown in FIG. 1.

Disk 36 is rotatable in the direction of the arrows in FIGS. 2 and 4 with the lower peripheral portion thereof disposed in the seed supply. In the position of the parts shown at the bottom of FIG. 3, the spring finger has been deflected axially against its inherent bias and the width of the channel between the seed-engaging face of the disk and pad 56 is sufficient only to accommodate a single line of seed so that each pad is assured of picking up a seed and the likelihood of more than one seed being received and clasped against the adjacent face of disk 36 is eliminated.

Successive deflection of fingers 36 to the open or seed-receiving position shown at the bottom of FIG. 3 is accomplished by the provision of actuating means in the form of a cam block 57 secured to wall 20 by bolts 58 and having a cam face that is engageable with the fingers to deflect them against their inherent bias in the manner shown, the cam face being contoured, as shown in FIG. 4, so that the exercise of the fingers' spring bias to allow pad 56 to clasp a seed against the face of the disk is gradual and the seed is trapped by the pad with minimum likelihood of the seed being prematurely dislodged.

As shown in FIG. 4 the inclined trailing edge 59 of the cam is engaged by the leading edges of the fingers and opens the seed-clasping portion 53 to receive a seed, spring bias moving pad 56 inwardly along a cam portion 60 to the inclined leading edge 61 to the closed position with pad 56 securely holding the single seed until the discharge outlet 62 is reached and the fingers engaged by another cam indicated at 63 again open pad 54 and allow the seed to be discharged through outlet 62 to the ground.

The width of channel 46 shown in FIG. 3 accepts ungraded corn seed as well as different kinds of more rounded seeds. In order to accommodate a grade of corn known as "Flats" and smaller varieties of seed means are provided for adjusting the position of disk 36 to narrow the channel 46 comprising a spacer 64, shown in FIG. 3. Spacer 64 has a central opening for slidable reception on hub 34, and to adjust the position of the disk 36, bolts 38 are withdrawn to allow the disk to be removed. The spacer is installed between flange 35 and the disk to shift the latter to the position indicated in FIG. 3 and bolts 38 replaced.

Clogging of runner 12, with the resultant backup of seed in housing 19 during operation endangers the projecting seed-clasping portion of fingers 50, and to avoid this the trailing edges of slots 52 are upset, as shown in FIG. 4, to form a protective backup wall or lug 65 adjacent the transverse portion 54 and pad 56 of each finger 50 although, if desired, lugs may be welded to the disk adjacent the trailing edges of the slots.

It is believed that the construction and operation of the seed-metering mechanism of this invention will be clearly understood from the foregoing description.

What is claimed is:

1. In a planter, a housing adapted to receive seed and form a supply of such seed in the lower portion of the housing, seed-metering means rotatably mounted in the housing including a disk having its lower peripheral portion rotatable in said seed supply, guide means in the housing spaced from said lower peripheral portion of the disk to form a restricted channel for the reception of single seeds, a seed pickup member mounted on the disk including a plurality of radially disposed spring fingers each having a seed-clasping portion biased toward the seed-engaging face of the disk and rotatable therewith in said channel, an actuating means in the housing, said fingers successively engaged by said actuating means during rotation of said disk to deflect said seed-clasping portion away from the disk to an open position to receive and upon release to clasp a seed therebetween in the adjacent face of the disk, a driven shaft mounted in said housing, a hub having a flange secured to said driven shaft and said disk mounted on said hub and removably secured to said flange, spacer means being provided for insertion between the flange and the disk to adjust the latter axially to selected positions to thus accommodate seed of different size.

2. The invention as set forth in claim 1, wherein said seed pickup member comprises a plurality of relatively thin spring steel segments circumferentially arranged on the face of said disk opposite to said seed-engaging face, each of said segments having a radially inner portion removably secured to the inner portion of the disk and formed integrally therewith a plurality of radially extending fingers.

3. The invention set forth in claim 2, wherein said segments are mounted on the face of said disk opposite said channel and said fingers are biased away from the disk, the outer end of each of said fingers having an axially bent seed-clasping portion, said disk having slots therein and said axially bent portions being slidably receivable in said slots and extending into said channel, each of said seed-clasping portions having its end bent parallel to the seed-engaging face of the disk to receive and hold a seed therebetween and the adjacent face of the disk.

4. The invention set forth in claim 3, wherein said spring fingers are axially biased in one direction to a closed position to clasp a seed between said seed-clasping portion and the seed-engaging face of the disk and are axially yieldable in the other direction to the open seed-receiving position and said actuating means comprises a cam mounted in the housing adjacent said opposite face of said disk and successively engageable with said fingers to open and close the seed-clasping portions of said fingers.

* * * * *